A. R. EISEMAN.
KITCHEN TABLE.
APPLICATION FILED JUNE 4, 1915.
1,219,715.
Patented Mar. 20, 1917.
Fig. 1.
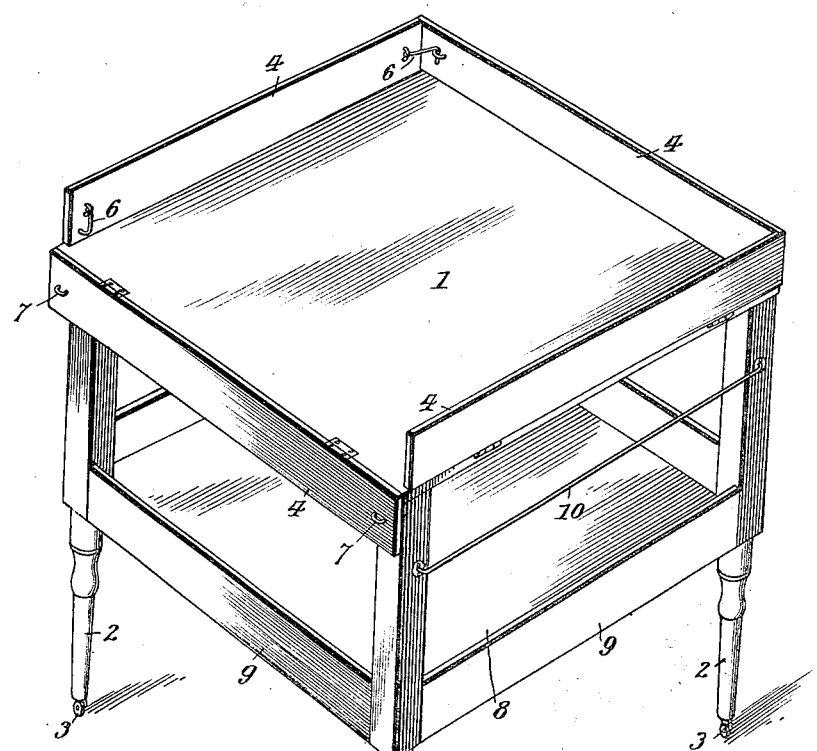
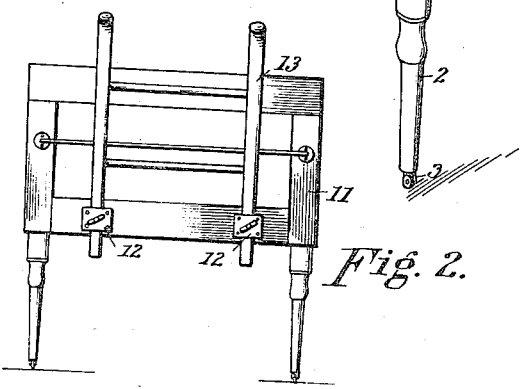
Fig. 2.
Inventor
Adelaide R. Eiseman
By
Attorney

UNITED STATES PATENT OFFICE.

ADELAIDE R. EISEMAN, OF BALTIMORE, MARYLAND.

KITCHEN-TABLE.

1,219,715.

Specification of Letters Patent.

Patented Mar. 20, 1917.

Application filed June 4, 1915. Serial No. 32,141.

*To all whom it may concern:*

Be it known that I, ADELAIDE R. EISEMAN, a citizen of the United States of America, residing at Baltimore, in the State of Maryland, have invented certain new and useful Improvements in Kitchen-Tables, of which the following is a specification.

This invention relates to new and useful improvements in tables and more particularly to kitchen tables and the primary object of the invention is to provide a device of this character which is designed in the form of a cart, to be readily moved from place to place so as to economize in time and labor.

A further object of the invention resides in providing a table, the top of which may be readily transformed into a box-like compartment for the purpose of holding dishes and kitchen utensils in the cleansing of the same.

Still another object resides in the provision of hinged flanges on the side and end edges of the top, which flanges may be disposed upwardly and downwardly with respect to the top, describing an arc of 180°.

A still further object resides in providing means for locking the flanges in upright position with respect to the table top, whereby to complete the formation of the box-like compartment thereon.

A still further object resides in providing a table having rollers on the legs thereof and provided with a removable handle to readily move the table from place to place when desired.

Another object of the invention is to provide a device which is simple and durable in construction, inexpensive to manufacture and one which will be very efficient and useful in operation.

With these and other objects in view, my invention consists in the novel features of construction, combination and arrangement of parts as will be hereinafter referred to and more particularly pointed out in the specification and claim.

In the accompanying drawing forming a part of this application:—

Figure 1 is a perspective view of a device constructed in accordance with my invention, and Fig. 2 is an end view of a slightly modified form of the invention.

In describing the invention, I shall refer to the drawing, in which similar reference characters designate corresponding parts throughout the several views and in which 1 designates a flat table top mounted in the usual or any preferred manner on the four legs 2, and mounted in the lower ends of the latter are the casters or rollers 3, which permit the table proper to be readily moved from place to place.

As indicated above, this table is primarily for kitchen use, although capable of other uses, and with this in mind, I have designed a top attachment which will enable the top proper to be transformed into a box-like compartment for the purpose of holding dishes and other kitchen utensils as the same are being cleansed, to save time and labor. It is a well known fact that considerable time and energy is exerted by a kitchen maid in the washing and drying of dishes and kitchen utensils, as ordinarily such operations require walking with each individual article from the place of cleansing to the cabinet or the like ordinarily provided for the purpose of retaining these dishes and utensils.

In carrying out my idea, I provide an improved table, which is a rolling one, as hereinbefore described and shown in the drawing. This table has flanges 4 hinged to the end and side edges of the table top 1, which when disposed to upright positions abut one another to form a box-like compartment for the reception of various articles.

These flanges 4, as will be seen from the drawing, swing upwardly and downwardly with respect to the top 1 and when swung downwardly, as shown by one of the side flanges in Fig. 1 of the drawing, will remain in such position through gravity. In order to retain the flanges in upright abutting position, however, so as to complete the formation of the box-like top, hook members 6 are provided on the inner faces of the end flanges 4 which are adapted for engagement with eyes 7 provided on the inner faces of the side flanges. When these flanges are locked in upright position, as shown and described, a compartment is formed within which the dishes and other utensils may be placed for any purpose desired, and the table proper may be moved from place to place without danger of the articles thereon being casually displaced or falling therefrom. When lowered, as shown by one of the flanges in Fig. 1 of the drawing, these flanges abut the legs of the table and hang freely from the top 1. In this position of the flanges, the top is that of an ordinary table so that the same may be used for any of the various purposes to which an ordinary table may be put.

If desired, a shelf 8 may be provided below the top 1 and secured between the legs 2. Rigidly secured to the side and end edges of the shelf 8 between the legs 2 are the flanges 9, and thus this table may be provided substantially with a double compartment to accommodate a large number of articles. It will of course be understood, however, this table may be constructed without the lower shelf and yet be very efficient in use.

Secured to the upper portions of the legs 2 at the ends of the table and below the flanges 4 are the racks 10, which are provided preferably for carrying towels and the like. These racks, however, may be utilized as handles in moving the table from place to place.

While I have particularly described this table as being for kitchen use, it will be understood that the same may also be used as an ordinary tea cart. In carrying out this idea, a handle member is desired, so that in Fig. 2 I have shown a slightly modified form of the invention. In this form, a table 11, identical to the table shown in Fig. 1 of the drawing is provided, the same having any approved clamping means 12 carried at one end thereof. A handle member 13 of any preferred form is also provided, the lower ends of which are adjustably and removably engaged with the clamping members 12, so that this device may be readily moved from place to place by use of the handle. The handle being removable, as shown and described, enables same to be removed and the table to be used for ordinary purposes, whenever desired.

This table has been described as being particularly adapted for use in the cleansing of dishes in the kitchen, saving time and labor in stepping from the sink, where dishes are washed, to the compartment where dishes are stored. The table, however, is equally adapted for use as a serving table and it will be seen that the cook need only wheel her table across from the stove, place the food in dishes thereon and wheel the table to the dining room, serving the complete hot meal in one trip, from her rolling table. Moreover, when the meals are finished, the table may be rolled into position in the dining room, the dishes removed from the dining table and piled on the rolling table without danger of same slipping therefrom. When the dining table is entirely cleared, this table filled with the soiled dishes may be rolled back to the kitchen where the dishes may be cleansed.

It is apparent that a table constructed as described hereabove will prove a time and labor saving device and being light of weight and durable, as well as inexpensive to manufacture, will be welcomed by all housewives.

From the foregoing it will be seen that I have provided a simple, inexpensive and efficient means for carrying out the objects of my invention and while I have particularly described the elements best adapted to perform the functions set forth, it is obvious that various changes in form, proportion and in the minor details of construction may be resorted to, without departing from the spirit or sacrificing any of the principles of the invention.

Having thus described my invention, what I claim and desire to secure by Letters Patent, is:—

A table of the class described comprising a top and supporting legs therefor, flanges hinged to the side and end edges of said top, and swinging in an arc of 180° to positions above and below said top, said flanges being so hinged as to permit their inner edges to rest flatly on said top, and to be supported vertically in one position thereof and to drop downwardly against the supporting legs and have said inner edges thereof fit flush with said top in the other position of the same, a pair of opposed flanges being shorter in length than the other opposed pair to permit the latter to rest flatly on the top and abut the end edges of the former in upright position, and locking means engaged with the inner faces of said flanges adjacent the ends thereof, whereby to lock said flanges in vertical position and form a box like top for the table.

In testimony whereof I affix my signature in the presence of two witnesses.

ADELAIDE R. EISEMAN.

Witnesses:
    MIRIAM ROSENFELD,
    ELSIE ROSENFELD.